(12) United States Patent
Park et al.

(10) Patent No.: US 9,842,382 B2
(45) Date of Patent: Dec. 12, 2017

(54) METHOD AND DEVICE FOR REMOVING HAZE IN SINGLE IMAGE

(71) Applicants: Hanwha Techwin Co., Ltd., Changwon-si (KR); KOREA UNIVERSITY RESEARCH AND BUSINESS FOUNDATION, Seoul (KR)

(72) Inventors: Dubok Park, Seoul (KR); Hanseok Ko, Seoul (KR)

(73) Assignees: Hanwha Techwin Co., Ltd., Changwon-Si (KR); KOREA UNIVERSITY RESEARCH AND BUSINESS FOUNDATION, Seoul (KR)

(*) Notice: Subject to any disclaimer, the term of this patent is extended or adjusted under 35 U.S.C. 154(b) by 0 days.

(21) Appl. No.: 14/888,852

(22) PCT Filed: Apr. 11, 2014

(86) PCT No.: PCT/KR2014/003144
§ 371 (c)(1),
(2) Date: Nov. 3, 2015

(87) PCT Pub. No.: WO2014/193080
PCT Pub. Date: Dec. 4, 2014

(65) Prior Publication Data
US 2016/0063684 A1    Mar. 3, 2016

(30) Foreign Application Priority Data
May 28, 2013 (KR) .................. 10-2013-0060600

(51) Int. Cl.
*G06T 5/00* (2006.01)
*H04N 5/361* (2011.01)
*H04N 5/365* (2011.01)

(52) U.S. Cl.
CPC .............. *G06T 5/001* (2013.01); *G06T 5/003* (2013.01); *H04N 5/361* (2013.01);
(Continued)

(58) Field of Classification Search
None
See application file for complete search history.

(56) References Cited

U.S. PATENT DOCUMENTS

2003/0202713 A1* 10/2003 Sowa .................. G06T 5/20
                                                      382/260
2010/0040300 A1    2/2010 Kang et al.
(Continued)

FOREIGN PATENT DOCUMENTS

CN          102750674 A      10/2012
KR      10-2011-0050775 A     5/2011
(Continued)

OTHER PUBLICATIONS

Yu, Jing, and Qingmin Liao. "Fast single image fog removal using edge-preserving smoothing." Acoustics, Speech and Signal Processing (ICASSP), 2011 IEEE International Conference on. IEEE, 2011.*

(Continued)

*Primary Examiner* — Michelle M Hausmann
(74) *Attorney, Agent, or Firm* — Sughrue Mion, PLLC

(57) ABSTRACT

The present invention provides a method for removing a haze in a single image. In the present invention, a transmission is estimated by using a dark channel prior obtained from a hazy input image. The estimated transmission includes a block artifact. In an exemplary embodiment of the present invention, in order to preserve an edge and remove the block artifact, a refined transmission value is obtained by performing WLS filtering by using an estimated transmission value and a morphologically-processed input image, the image is (Continued)

restored based on the refined transmission value, and then multi-scale tone manipulation image processing is performed.

8 Claims, 7 Drawing Sheets

(52) U.S. Cl.
CPC . *H04N 5/3651* (2013.01); *G06T 2207/10016* (2013.01); *G06T 2207/20192* (2013.01)

(56) References Cited

U.S. PATENT DOCUMENTS

| | | | | |
|---|---|---|---|---|
| 2010/0067574 | A1* | 3/2010 | Knicker | G06T 5/002 375/240.12 |
| 2010/0322478 | A1 | 12/2010 | Nitanda | |
| 2011/0188775 | A1* | 8/2011 | Sun | G06K 9/40 382/274 |
| 2011/0211758 | A1* | 9/2011 | Joshi | G06T 5/003 382/167 |
| 2012/0200669 | A1* | 8/2012 | Lai | G06T 5/002 348/43 |
| 2012/0236020 | A1* | 9/2012 | Paris | G06T 5/009 345/589 |
| 2013/0071043 | A1* | 3/2013 | Bai | G06T 5/003 382/255 |
| 2013/0089247 | A1* | 4/2013 | Mercuriev | G06T 5/002 382/128 |
| 2014/0003528 | A1* | 1/2014 | Tourapis | H04N 19/00424 375/240.16 |
| 2014/0321540 | A1* | 10/2014 | Leontaris | H04N 19/597 375/240.03 |

FOREIGN PATENT DOCUMENTS

| | | |
|---|---|---|
| KR | 10-2012-0079564 A | 7/2012 |
| KR | 10-2013-0015906 A | 2/2013 |
| WO | 2013/018101 A1 | 2/2013 |

OTHER PUBLICATIONS

Gibson, Kristofor, Dũng Võ, and Truong Nguyen. "An investigation in dehazing compressed images and video." OCEANS 2010. IEEE, 2010.*

Yu, Jing et al.; "Fast Single Image Fog Removal Using Edge-Preserving Smoothing"; ICASSP; 2011; pp. 1245-1248.

He, Kaiming et al.; "Single Image Haze Removal Using Dark Channel Prior"; IEEE Transactions on Pattern Analysis and Machine Intelligence; vol. 33; No. 12; Dec. 2011; 14 pages total.

Search Report dated Jul. 17, 2014 issued by the International Searching Authority in counterpart International Patent Application No. PCT/KR2014/003144 (PCT/ISA/210).

Written Opinion dated Jul. 17, 2014 issued by the International Searching Authority in counterpart International Patent Application No. PCT/KR2014/003144 (PCT/ISA/237).

Communication dated Jul. 19, 2017, issued by the State Intellectual Property Office of P.R. China in counterpart Chinese Application No. 201480030119.1.

Luc Vincent: "Morphological Grayscale Reconstruction in Image Analysis: Applications and Efficient Algorithms" IEEE Transactions on Image Processing, vol. 2, No. 2, Apr. 1993, pp. 176201, (26 pages total).

Park et al: "Single Image Haze Removal With Wls-Based Edge-Preserving Smoothing Filter", ICASSP 2013, pp. 2469-2473, (8 pages total).

Farbman et al:" Edge-Preserving Decompositions for Multi-Scale Tone and Detail Manipulation", ACM Transactions on Graphics, vol. 27, No. 3, Article 67, Aug. 2008, pp. 1-10, (10 pages total).

* cited by examiner

METHOD AND DEVICE FOR REMOVING HAZE IN SINGLE IMAGE

This application is a National Stage of International Application No. PCT/KR2014/003144, filed Apr. 11, 2014, and claims priority from Korean Patent Application No. 10-2013-0060600 filed May 28, 2013, the disclosures of which are incorporated herein in their entirety by reference.

TECHNICAL FIELD

The present invention relates to processing an image with a video quality degraded due to a haze included therein, and improving a video quality thereof.

BACKGROUND ART

In general, the quality of an image captured outdoors is degraded by a turbid medium such as atmospheric particles and trickles. In particular, the video quality of an image is influenced by weather, which influences the identification of the original color and shape of an object included in the image.

In particular, since haze-induced video quality degradation occurs throughout the image and is maintained relatively uniformly and continuously, various techniques are proposed to remove the haze-induced video quality degradation.

Hazy image improving methods are classified into a model-based method using an atmospheric physical model and a nonmodel-based method without using an atmospheric physical model.

Unlike the model-based method, the nonmodel-based method does not estimate an atmospheric parameter and may be simply implemented. However, the nonmodel-based method has a problem of distorting a color fidelity and a haze removing effect. Therefore, recently, it is common to improve a hazy image by using the model-based method using a piece of image.

On the other hand, since the model-based method uses an atmospheric physical model, the model-based method may effectively improve a color tone and a contrast degraded by scattered light. However, the model-based method has difficulty in accurately estimating a parameter and has a drawback of taking a long operation time.

DETAILED DESCRIPTION OF THE INVENTION

Technical Problem

Recently, as an example of the model-based method for improving a hazy image, there is a method of using a dark channel prior (DCP) in a piece of hazy image. However, in the case of a DCP method, since the color information feature of an RGB image is estimated on a patch basis, an operation time increases. Also, when an image is generally white or dark, a distortion occurs in the image due to the misestimation of a transmission.

Also, in the case of other model-based methods for improving a hazy image, since there is no image texture information compensation and brightness correction due to the subtraction of scattered light, there is a problem in that the restored image has a weak texture and low brightness.

An exemplary embodiment of the present invention improves the problem of the DCP method and restores/improves haze-induced image color damage and contrast degradation by using a single image. Also, the present invention provides a method for improving an image texture and solving a brightness degradation problem occurring in the conventional hazy image improving process.

Technical Solution

The present invention provides a method for removing a haze in a single image. In the present invention, a transmission is estimated by using a dark channel prior obtained from a hazy input image. The estimated transmission includes a block artifact. In an exemplary embodiment of the present invention, in order to preserve an edge and remove the block artifact, a refined transmission value is obtained by performing weighted least square (WLS) filtering by using an estimated transmission value and a morphologically-processed input image, the image is restored based on the refined transmission value, and then multi-scale tone manipulation image processing is performed.

Advantageous Effects of the Invention

The present invention has an advantageous effect of solving a problem occurring in a hazy image processing process by using a dark channel prior (DCP) in a hazy image. For example, the present invention has an advantageous effect of solving a block artifact problem occurring in an image restored through a transmission obtained by estimating the color information feature of an RGB image on a patch basis.

Also, the present invention has an advantageous effect of improving the texture and brightness of a restored image by performing image texture information compensation and brightness correction due to the subtraction of scattered light in a hazy image improving process.

Best Mode

Figure 1:
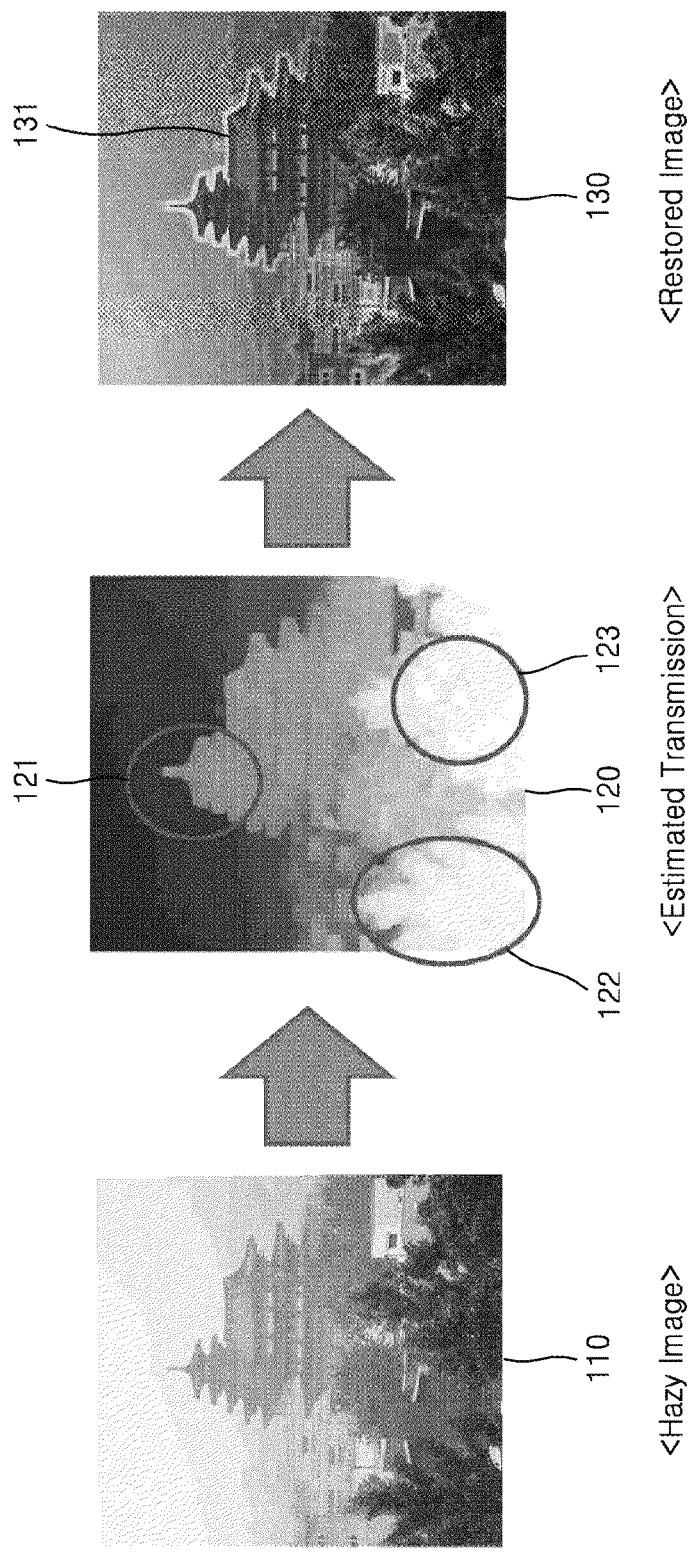
FIG. 1 illustrates an example of a hazy image restoring method.

According to an exemplary embodiment of the present invention, a device for removing a haze in a single image includes: an image analyzing unit configured to generate a dark channel prior representing a distance-dependent haze density in an input image including a haze component; a transmission estimating unit configured to calculate an estimated transmission by estimating an amount of light reaching a photographing device based on the dark channel prior; a transmission refining unit configured to calculate a refined transmission by applying weighted least square (WLS) filtering based on the estimated transmission and morphologically-processed input image information, wherein the refined transmission represents information obtained by preserving edge information and removing a block artifact in the estimated transmission; and an image restoring unit configured to generate a restored image by removing the haze component in the input image based on the refined transmission.

For example, the device may further include an image processing unit configured to perform image processing for improvement of a local contrast of the restored image by dividing the restored image into a base layer, a medium layer, and a fine layer.

According to another exemplary embodiment of the present invention, a device for removing a haze in a single image includes: a transmission estimating unit configured to calculate a first transmission by estimating a transmission value based on a dark channel prior generated from a hazy input image; a transmission refining unit configured to calculate a second transmission for minimizing a block artifact generated in an image restoration process based on the first transmission by applying WLS filtering based on the first transmission and morphologically-processed input image information; an image restoring unit configured to generate a restored image by removing a haze component in the hazy input image based on the second transmission; and an image processing unit configured to perform multi-scale tone manipulation image processing on the restored image.

According to another exemplary embodiment of the present invention, a method for removing a haze in a single image includes: generating, by an image analyzing unit, a dark channel prior representing a distance-dependent haze density in an input image including a haze component; calculating, by a transmission estimating unit, an estimated transmission by estimating an amount of light reaching a photographing device based on the dark channel prior; calculating, by a transmission refining unit, a refined transmission by applying WLS filtering based on the estimated transmission and morphologically-processed input image information, wherein the refined transmission represents information obtained by preserving edge information and removing a block artifact in the estimated transmission; and generating, by an image restoring unit, a restored image by removing the haze component in the input image based on the refined transmission.

According to another exemplary embodiment of the present invention, a method for removing a haze in a single image includes: calculating, by a transmission estimating unit, a first transmission by estimating a transmission value based on a dark channel prior generated from a hazy input image; calculating, by a transmission refining unit, a second transmission for minimizing a block artifact generated in an image restoration process based on the first transmission by applying WLS filtering based on the first transmission and morphologically-processed input image information; generating, by an image restoring unit, a restored image by removing a haze component in the hazy input image based on the second transmission; and performing, by an image processing unit, multi-scale tone manipulation image processing on the restored image.

Mode of the Invention

A method for referring to an elementary stream located in an SAF session according to the present invention for achieving the above-described object will become apparent and more readily appreciated from the following detailed description taken in conjunction with the accompanying drawings. Hereinafter, exemplary embodiments of the present invention will be described in detail with reference to the accompanying drawings.

FIG. 1 illustrates a phenomenon in which an artifact occurs in a conventional hazy image restoring process. In the conventional hazy image restoring process, since a transmission is estimated on a block-by-block basis, an artifact phenomenon occurs in a final haze-free image. In detail, there is a phenomenon in which an artifact occurs in a block of a restored final image 130 after a transmission is estimated in a hazy image 110 through Equations 1 to 4.

In general, a Koschmider model such as Equation 1 is widely used to represent an image including a haze.

$$I(p)=J(p)r(p)+A(1-r(p)) \quad \text{[Equation 1]}$$

In Equation 1, I(p) denotes an input image including a haze, J(p) denotes a scene radiance representing a haze-free state, A denotes a global atmospheric light source, and r(p) denotes a transmission estimated corresponding to each pixel of the input image. The transmission refers to the amount of light reaching a photographing device without dispersion.

The Koschmider model such as Equation 1 is represented for each of the R, G, and B color channels of the image. By using Equation 1, the global atmospheric light source A and the transmission r(p) are calculated from the input image I(p) including a haze, and then the scene radiance J(p) is acquired.

As the transmission r(p) decreases in Equation 1, the input image I(p) becomes a hazier image. Also, as the transmission r(p) increases, a distance to a subject decreases or a haze-induced distortion decreases.

According to an exemplary embodiment of the present invention, a dark channel prior (DCP) is used to estimate the transmission r(p) in Equation 1. However, in a conventional hazy image processing method, since only a DCP is used, there is a problem in that an artifact occurs in a restored image (see 131 in FIG. 1).

In order to solve this problem, according to an exemplary embodiment of the present invention, a DCP is used to obtain an estimated transmission (120 in FIG. 1), and weighted least square (WLS) filtering is additionally applied to the estimated transmission value to obtain a refined transmission, thereby solving the problem of artifact occurrence. This will be described 1 in detail with reference to FIG. 2.

As for the DCP, as a method for removing a haze in an image, some pixels in a block of a predetermined size around each pixel of a haze-free clean image are implemented such that at least one color channel has a very small near-zero value. This is represented as Equations 2 and 3.

$$J^{dark}(p) = \min_{q \in \Omega(p)} \left( \min_{c \in \{r,g,b\}} J^c(q) \right) \quad \text{[Equation 2]}$$

$$J^{dark} \to 0 \quad \text{[Equation 3]}$$

In Equation 2, $J^{dark}$ denotes a DCP, $J^c$ denotes an input image of each color channel, and $\Omega$ denotes a block (or patch) around a P pixel.

When Equation 3 is used, the transmission r(p) in Equation 1 may be modified as Equation 4.

$$\tilde{r}(p) = 1 - \mu \min_{q \in \Omega(p)} \left( \min_{c \in \{r,g,b\}} \frac{I^c(q)}{A^c} \right)$$ [Equation 4]

In Equation 4, μ is a constant value of about 0.95.

In the conventional art, a transmission r̃(p) in Equation 4 is estimated on a block-by-block basis (121, 122, 123) (120 in FIG. 1). In this case, there is a problem in that an artifact (131, 132) such as a jaggy phenomenon occurs in a block boundary line when a haze-free image J(p) (130 in FIG. 1) is restored.

As a scheme for solving this problem, a soft matting algorithm or the like is used. However, since the soft matting algorithm is complex and has a large operation amount, the soft matting algorithm has another problem of the impossibility of processing due to the lack of memory capacity when the image resolution is high.

An exemplary embodiment of the present invention provides a scheme for solving the problems of a complex operation and an artifact phenomenon occurring in the hazy image processing process.

For this purpose, according to an exemplary embodiment of the present invention, a block artifact may be removed by applying WLS filtering to the transmission r̃(p) obtained in Equation 4, and then brightness control image processing may be performed in a base layer image and image processing for improving a local texture may be performed in a medium layer image and a fine layer image.

Hereinafter, in an exemplary embodiment of the present invention, for prevention of a confusion between the terms, r̃(p) denotes an estimated transmission (see 320 in FIG. 3) obtained through Equation 4, and r(p) denotes a refined transmission (see 340 in FIG. 3) obtained finally by WLS filtering.

Figure 2:
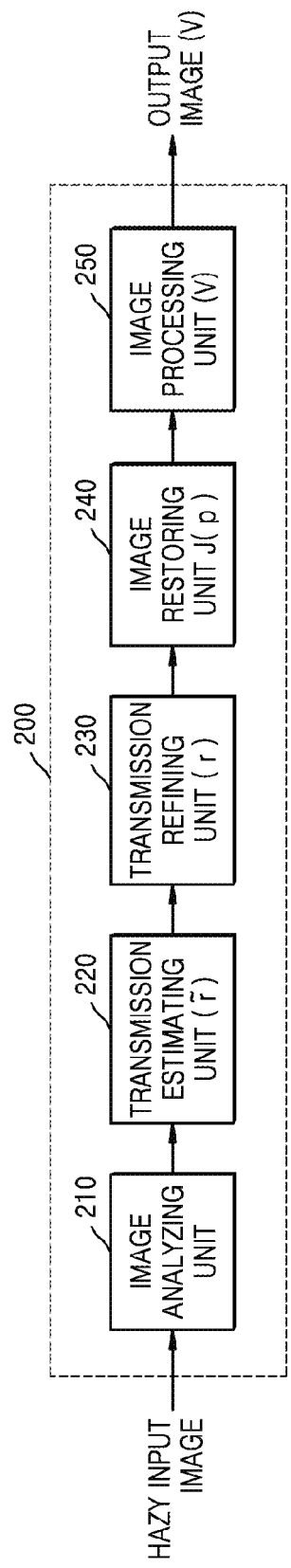
FIG. 2 illustrates a single image haze removing device according to an exemplary embodiment of the present invention.

FIG. 2 illustrates a single image haze removing device according to an exemplary embodiment of the present invention.

Referring to FIG. 2, a single image haze removing device 200 includes an image analyzing unit 210, a transmission estimating unit 220, a transmission refining unit 230, and an image processing unit 250.

The image analyzing unit 210 generates a DCP representing a distance-dependent haze density in an input image including a haze component. A method of generating the DCP refers to Equations 2 and 3.

The transmission estimating unit 220 calculates an estimated transmission r̃(p) by applying the DCP generated by the image analyzing unit 210. A method of calculating the estimated transmission refers to Equation 4. In this case, since the estimated transmission r̃(P) is estimated on a block-by-block basis, a block artifact (see 121, 122, and 123 in FIG. 1) is included therein.

The transmission refining unit 230 calculates a refined transmission r(p) by using a morphologically-processed input image (330 in FIG. 3) and an estimated transmission value r̃(P) (320 in FIG. 3) calculated by the transmission estimating unit 220.

For example, the transmission refining unit 230 calculates the refined transmission r(p) by removing the block artifact included in the estimated transmission by applying WLS filtering to the estimated transmission value r̃(p) calculated by the transmission estimating unit 220.

The transmission refining unit 230 sets an edge value of the morphologically-processed input image (330 in FIG. 3) as a weight in the process of applying the WLS filtering. This refers to Equations 5 to 7.

Figure 3:
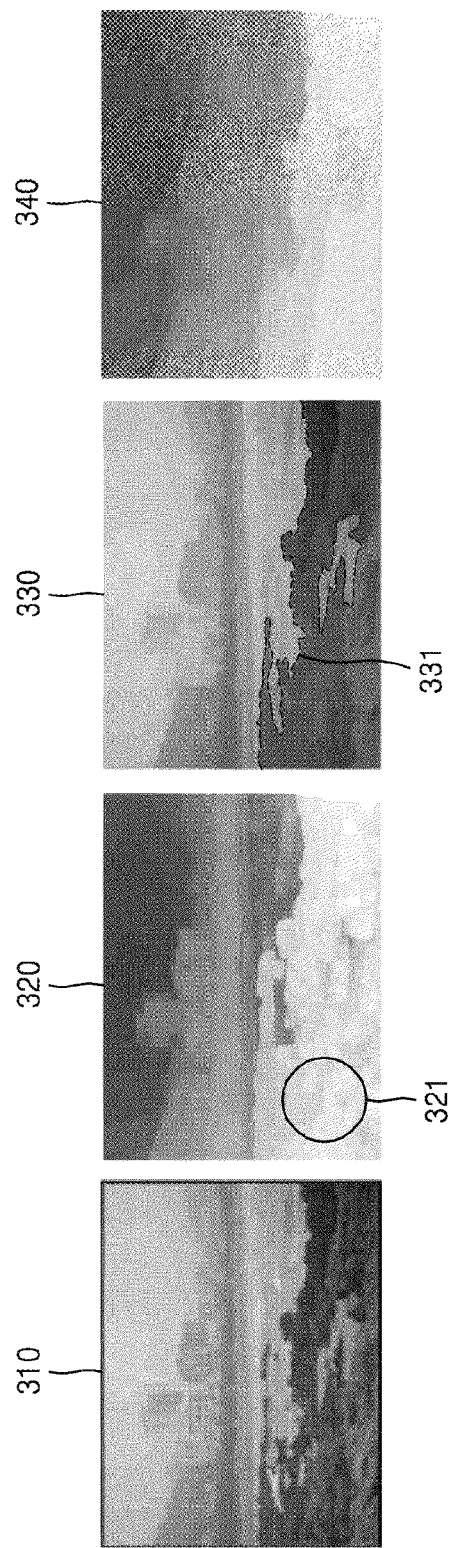
FIG. 3 illustrates an estimated transmission image 320 obtained from a hazy input image 310, a morphologically-processed input image 330, and a refined transmission image 340 obtained by using the estimated transmission image 320 and the morphologically-processed input image 330, according to an exemplary embodiment of the present invention.

Referring to FIG. 3, the transmission refining unit 230 calculates a refined transmission r(p) by preserving an edge value of an input image (310 in FIG. 3) and removing (smoothing) a block artifact (e.g., 321 in FIG. 3) generated in the estimated transmission r̃(p), in order to minimize the block artifacts that may be generated when the image is restored by using the estimated transmission r̃(p).

For this purpose, in the estimated transmission r̃(p), the edge value of a region corresponding to the edge value (e.g., 331 in FIG. 3) of the morphologically-processed input image is preserved, and the block artifact of the other region is smooth-processed.

In an exemplary embodiment of the present invention, this process is referred to as a WLS filtering process, which uses Equations 5 to 7.

The image restoring unit 240 generates a restored image J(p) by removing the haze component in the input image based on the refined transmission value r(p), as represented in Equation 8.

The image processing unit 250 performs multi-scale tone manipulation image processing on the restored image J(p). As represented in Equation 10, a multi-scale image is generated by the difference between the images smoothed through a WLS filter.

In detail, for improvement of a local contrast of the restored image J(p) obtained in Equation 8, as represented in Equation 9, image processing is performed by dividing the restored image J(p) into a base layer, a medium layer, and a fine layer.

The image processing unit 250 is implemented to perform brightness control image processing in the base layer image and perform image processing for improvement of a local texture in the medium layer image and the fine layer image.

The image restoring unit 240 and the image processing unit 250 will be described later in detail with reference to FIG. 6.

FIG. 3 illustrates an estimated transmission image 320 obtained from a hazy input image 310, a morphologically-processed input image 330, and a refined transmission image 340 obtained by using the estimated transmission image 320 and the morphologically-processed input image 330, according to an exemplary embodiment of the present invention.

$$\sum_p \left( (r_p - \tilde{r}_p)^2 + \lambda \left( w_{x,p}(h) \left(\frac{\partial r}{\partial x}\right)_p^2 + w_{y,p}(h) \left(\frac{\partial r}{\partial y}\right)_p^2 \right) \right)$$ [Equation 5]

In Equation 5, p denotes a position of each pixel, $r_p$ denotes a refined transmission (340 in FIG. 3), r̃(p) denotes an estimated transmission (320 in FIG. 3) calculated in Equation 4, and λ denotes a smoothing control constant.

Figure 4:
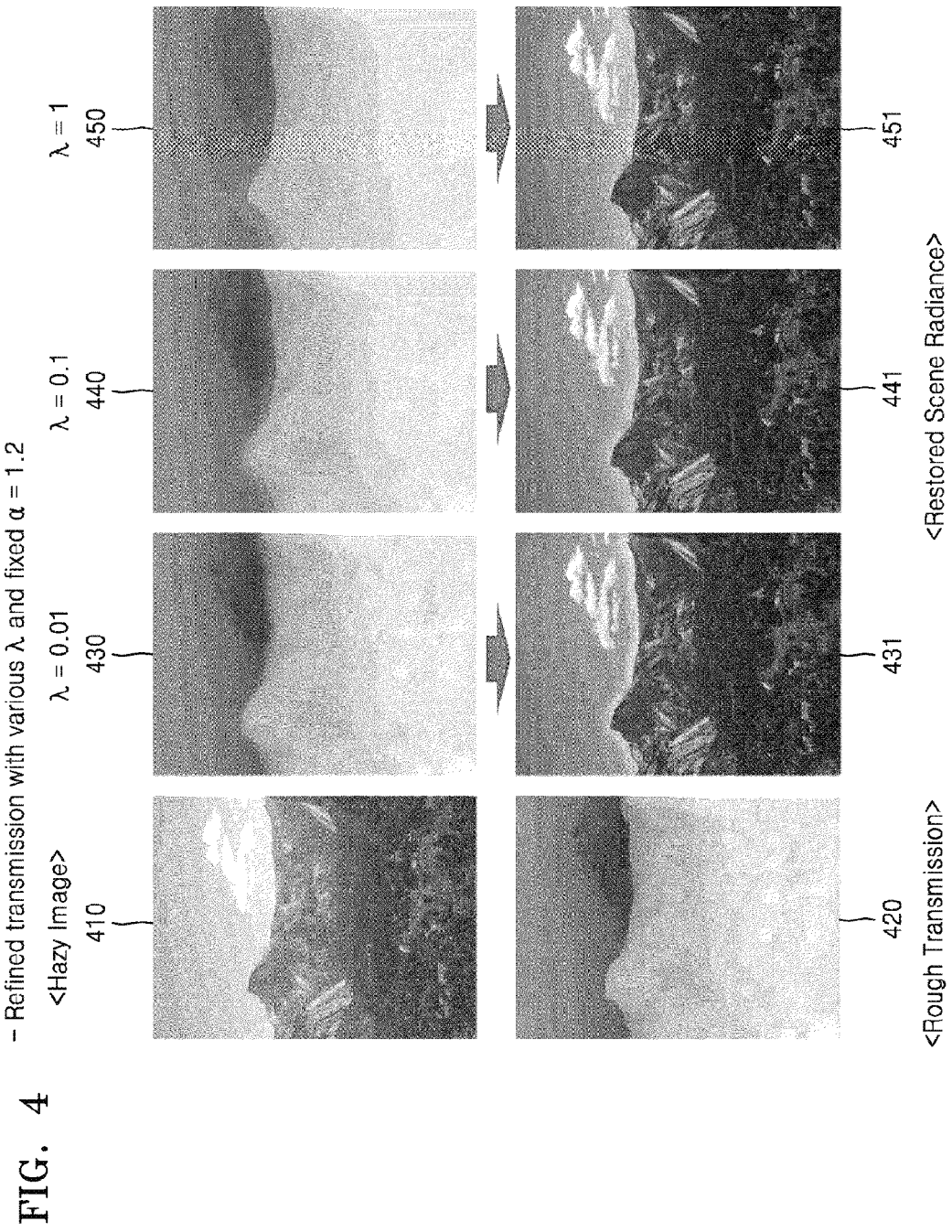
FIG. 4 illustrates a restored image when various smoothing control constant values λ are applied to an input image 410 including a haze, according to an exemplary embodiment of the present invention.

An output image $r_p$ (340 in FIG. 3) is further smoothed as a λ value increases. Referring to FIG. 4, it may be seen that the output image $r_p$ is further smoothed as the λ value increases.

Also, $$\left(\frac{\partial r}{\partial x}\right)_p, \left(\frac{\partial r}{\partial y}\right)_p$$

denotes a horizontal-axis and vertical-axis first-order differential operator of the output image $r_p$ (340 in FIG. 3); and $w_{x,p}(h)$, $w_{y,p}(h)$ denotes a smoothing weight value of the morphologically-processed hazy image (330 in FIG. 3), which is represented as Equation 6. Also, the smoothing weight value $w_{x,p}(h)$, $w_{y,p}(h)$ is used to control the smoothing degree of the artifact of the estimated transmission including a block artifact.

The smoothing weight value is applied to an estimated transmission image 320 of FIG. 3 to preserve a region corresponding to an edge region 331 of a morphologically-processed hazy image 330 and smooth the other region thereof in the estimated transmission image 320.

According to an exemplary embodiment of the present invention, a refined transmission value for minimizing an object function of Equation 5 is obtained. For this purpose, a pixel value difference between the input image (the estimated transmission, $\tilde{r}(p)$, and 320 in FIG. 3) and the output image (the refined transmission, $r_p$, and 340 in FIG. 3) is minimized $((r_p - \tilde{r}_p)^2)$, and the block artifacts generated in an image restoration process is minimized by the estimated transmission by using the edge of the morphologically-processed input image $$\left( \lambda \left( w_{x,p}(h) \left( \frac{\partial r}{\partial x} \right)_p^2 + w_{y,p}(h) \left( \frac{\partial r}{\partial y} \right)_p^2 \right) \right).$$

$$w_{x,p}(h) = \left( \left| \frac{\partial h}{\partial x} \right|_p^\alpha + \varepsilon \right)^{-1}, \; w_{y,p}(h) = \left( \left| \frac{\partial h}{\partial y} \right|_p^\alpha + \varepsilon \right)^{-1} \quad \text{[Equation 6]}$$

In Equation 6, h denotes a morphologically-processed hazy image (330 in FIG. 3), and $\alpha$ denotes an edge control constant of the morphologically-processed hazy image h. As $\alpha$ increases, the other region other than the region corresponding to the edge region 331 of the morphologically-processed hazy image 330 is further smoothed. This refers to FIG. 5.

Also, $\varepsilon$ denotes a constant value for preventing a denominator from being divided by 0, and may have a value of about $10^{-4}$. Also, $$\frac{\delta h}{\delta x}, \frac{\delta h}{\delta y}$$

denotes the horizontal-axis and vertical-axis first-order differential absolute value of the morphologically-processed hazy image (330 in FIG. 3). By differentiating Equation 5, a refined transmission r is obtained as Equation 7.

$$r = (I + \lambda(D_x^T A_x D + D_y^T A_y D_y))^{-1} \tilde{r} \quad \text{[Equation 7]}$$

In Equation 7, Ax, Ay denotes a matrix of the smoothing weight values $w_{x,p}(h)$, $w_{y,p}(h)$; and Dx, Dy denotes a matrix of $$\left( \frac{\partial r}{\partial x} \right)_p, \left( \frac{\partial r}{\partial y} \right)_p.$$

In this case, A may be implemented to use a value of the pixel having the greatest pixel value among the upper 0.1% in the DCP value obtained through Equation 2.

When the refined transmission r(p) is obtained through Equations 5 to 7, a haze-free restored image J(p) may be obtained as Equation 8 according to an exemplary embodiment of the present invention. In this case, A may be implemented to use a value of the pixel having the greatest pixel value among the upper 0.1% in the DCP value obtained through Equation 2. This will be described later with reference to FIG. 6.

FIG. 4 illustrates a restored image when various smoothing control constant values $\lambda$ are applied to an input image 410 including a haze, according to an exemplary embodiment of the present invention.

As the smoothing control constant $\lambda$ increases in Equation 5, the output image $r_p$ (340 in FIG. 3) is further smoothed. An exemplary case of restoring an image by applying Equations 5 to 7 to an input image 410 including a haze is illustrated as an example. In this case, an edge control constant value $\alpha=1.2$ of a morphologically-processed hazy image is used.

In FIG. 4, after an estimated transmission 410 is obtained, a refined transmission 430 and a restored image 431 in the case of $\lambda=0.01$, a refined transmission 440 and a restored image 441 in the case of $\lambda=0.1$, and a refined transmission 450 and a restored image 451 in the case of $\lambda=1$ are illustrated. It may be seen that the refined transmission value is further smoothed as the $\lambda$ value increases.

Figure 5:
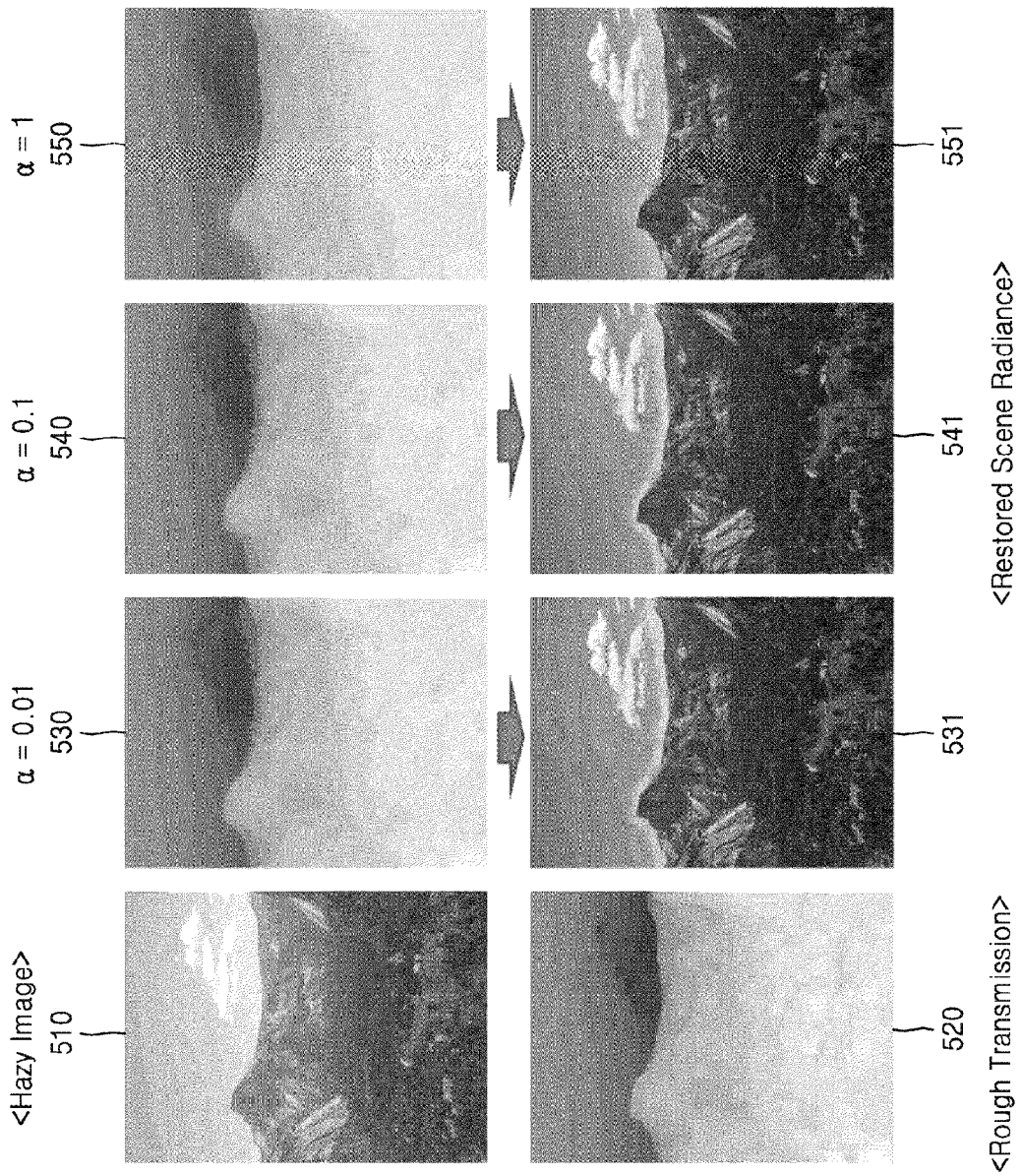
FIG. 5 illustrates a restored image according to a change in an edge control constant α of a morphologically-processed hazy image, according to an exemplary embodiment of the present invention.

FIG. 5 illustrates a restored image according to a change in an edge control constant $\alpha$ of a morphologically-processed hazy image, according to an exemplary embodiment of the present invention. In FIG. 5, a smoothing control constant value $\lambda=1$ is used.

Herein, $\alpha$ is the edge control constant of the morphologically-processed hazy image. As $\alpha$ increases, the other region other than the region corresponding to the edge region 331 of the morphologically-processed hazy image 330 is further smoothed.

After an estimated transmission 520 of an input image 510 is obtained, a refined transmission 530 and a restored image 531 in the case of $\alpha=0.01$, a refined transmission 540 and a restored image 541 in the case of $\alpha=0.1$, and a refined transmission 550 and a restored image 551 in the case of $\alpha=1$ are illustrated. As $\alpha$ increases, the other region other than the region corresponding to the edge region of the morphologically-processed hazy image is further smoothed.

Figure 6:
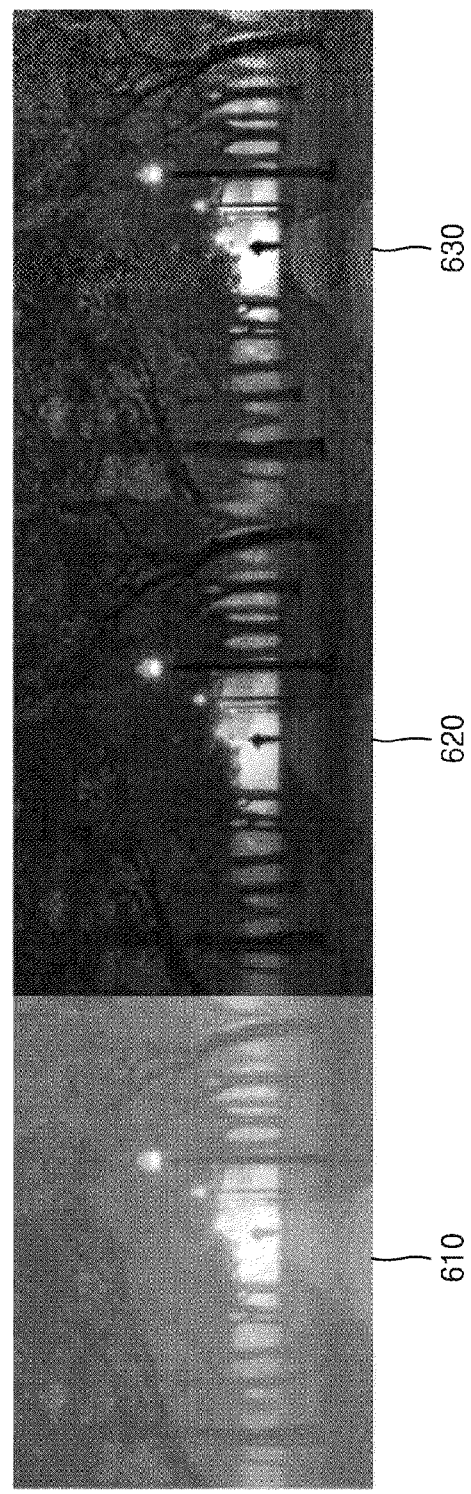
FIG. 6 illustrates a restored image of a hazy image and an image-processed final image of the restored image according to an exemplary embodiment of the present invention.

FIG. 6 illustrates a restored image of a hazy image and an image-processed final image of the restored image according to an exemplary embodiment of the present invention.

When a refined transmission is obtained from a hazy input image 610, a restored image J(p) 620 is obtained based on Equation 8.

$$J(p) = \frac{I(p) - A}{\max(r(p), r_0)} + A \quad \text{[Equation 8]}$$

In Equation 8, $r_0$ denotes a constant value for preventing a denominator from being divided by 0, which may be implemented to use a value of about 0.1.

In order to improve the local contrast of the restored image J(p) 620 obtained in Equation 8, the image processing unit (250 in FIG. 2) obtains an output image V 630 by performing image processing as Equation 9 by dividing the restored image J(p) into a base layer, a medium layer, and a fine layer.

$$V_p = B + S(\delta, d_p^1) + S(\delta, d_p^2) \quad \text{[Equation 9]}$$

In Equation 9, $V_p$ denotes an output image, B denotes a base layer image, and $S(\delta, d_p^1)$ and $S(\delta, d_p^2)$ denote a medium layer image and a fine layer image respectively.

Also, S( ) denotes a sigmoid function, and δ denotes a boosting factor and represents a reverse transmission. In an exemplary embodiment of the present invention, the reverse transmission may be implemented to use a value modified from 0 to 10. As the boosting factor increases, the texture information survives strongly in the corresponding layer.

In Equation 9, $d^i$ denotes an image generated in an i-th step, which is obtained as Equation 10.

$$d^i = u_{i-1} - u_i, i=1,2,\ldots,k \ (K: \text{Number of Layers}) \qquad [\text{Equation 10}]$$

In an exemplary embodiment of the present invention, K=2 may be set.

Brightness control image processing such as gamma correction is performed in the base layer image, and texture improvement is performed in the medium layer image and the fine layer image. For this purpose, a difference value between the images smoothed through a WLS filter is used as represented in Equation 10.

In detail, according to an exemplary embodiment of the present invention, in order to improve the texture information and the local contrast of the restored image J(p), image processing is performed to enhance a band-pass signal component in the medium layer and enhance a high-pass signal component in the fine layer.

Figure 7:
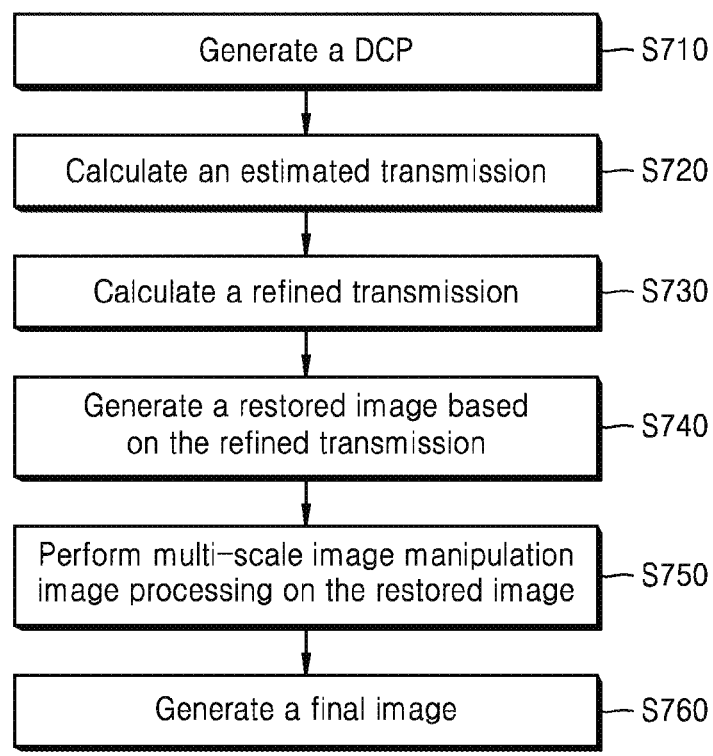
FIG. 7 illustrates a flow diagram of a method for removing a haze in a single image according to an exemplary embodiment of the present invention.

FIG. 7 illustrates a flow diagram of a method for removing a haze in a single image according to an exemplary embodiment of the present invention.

Referring to FIG. 7 together with FIG. 2, the image analyzing unit 210 generates a DCP representing a distance-dependent haze density in an input image including a haze component (S710). A method of generating the DCP refers to Equations 2 and 3.

The transmission estimating unit 220 calculates an estimated transmission based on the DCP (S720). A method of calculating the estimated transmission refers to Equation 4. The transmission represents the amount of light reaching a photographing device. The estimated transmission calculated by the transmission estimating unit 220 includes a block artifact because it is estimated on a block-by-block basis in Equation 4.

Thereafter, the transmission refining unit 230 calculates a refined transmission by applying WLS filtering based on the estimated transmission and morphologically-processed input image information (S730). According to an exemplary embodiment of the present invention, the refined transmission represents information obtained by preserving edge information and removing a block artifact in the estimated transmission. For this purpose, the transmission refining unit 230 performs WLS filtering. By using the edge information of the morphologically-processed input image in a WLS filtering process, the edge information of the morphologically-processed input image is preserved in the estimated transmission, and the other region other than the edge region of the morphologically-processed input image is smooth-processed.

Thereafter, the image restoring unit 240 generates a restored image by removing the haze component in the input image based on the refined transmission (S740). In this case, the restored image may be generated by using Equation 1 or 8.

Thereafter, the image processing unit 250 generates a final image by performing multi-scale image manipulation image processing on the restored image (S750 and S760). This refers to Equations 9 and 10.

The present invention may also be embodied as computer-readable codes on a computer-readable recording medium. The computer-readable recording medium may be any data storage device that may store data which may be thereafter read by a computer system. Examples of the computer-readable recording medium may include ROMs, RAMs, CD-ROMs, magnetic tapes, floppy disks, and optical data storages. The computer-readable recording medium may also be distributed over network-coupled computer systems so that the computer-readable codes may be stored and executed in a distributed fashion.

The exemplary embodiments have been described above with reference to the drawings. The terms herein are only used to describe the present invention and are not intended to limit the scope of the present invention as defined by the following claims. Therefore, those of ordinary skill in the art will understand that various modifications and other equivalent embodiments are possible therefrom. Thus, the scope of the present invention should be defined by the appended claims.

The invention claimed is:

1. A device for removing a haze in a single image, the device comprising:
    a processor; and
    a non-transitory computer-readable recording medium storing instructions which, when executed by the processor, cause the processor to perform operations comprising:
        calculating a first transmission by estimating a transmission value based on a dark channel prior generated from a hazy input image,
        calculating a second transmission for minimizing a block artifact generated in an image restoration process based on the first transmission by applying weighted least square (WLS) filtering based on the first transmission and morphologically-processed input image information,
        generating a restored image by removing a haze component in the hazy input image based on the second transmission, and
        performing multi-scale tone manipulation image processing on the restored image,
    wherein the second transmission is calculated by an equation, $$\sum_p \left( (r_p - \tilde{r}_p)^2 + \lambda \left( w_{x,p}(h) \left( \frac{\partial r}{\partial x} \right)_p^2 + w_{y,p}(h) \left( \frac{\partial r}{\partial y} \right)_p^2 \right) \right),$$

where p denotes a position of each pixel in the hazy input image, $r_p$ denotes a refined transmission, $\tilde{r}_p$ denotes the estimated transmission value, λ denotes a smoothing control constant, h denotes a morphologically-processed hazy image, $w_{x,p}(h)$ and $w_{y,p}(h)$ respectively denote horizontal-axis and vertical-axis smoothing weight values of the morphologically-processed hazy image, and $$\left( \frac{\partial r}{\partial x} \right)_p \text{ and } \left( \frac{\partial r}{\partial y} \right)_p$$

respectively denote horizontal-axis and vertical-axis first-order differential operators of r.

2. The device of claim 1, wherein the dark channel prior is generated by an equation $$J^{dark}(p) = \min_{q \in \Omega(p)} \left( \min_{c \in \{r,g,b\}} J^c(q) \right), J^{dark} \to 0$$

where $J^{dark}$ denotes a dark channel prior; $J^c$ denotes an input image of each color channel; and $\Omega$ denotes a block around a P pixel.

3. The device of claim 1, wherein the second transmission is a value obtained by preserving edge information and removing a block artifact in the first transmission based on the edge information of the morphologically-processed input image.

4. The device of claim 1, wherein the multi-scale tone manipulation image processing is performed by dividing the restored image into a base layer, a medium layer, and a fine layer.

5. A method for removing a haze in a single image, the method comprising:
   calculating, by a transmission estimating unit, a first transmission by estimating a transmission value based on a dark channel prior generated from a hazy input image;
   calculating, by a transmission refining unit, a second transmission for minimizing a block artifact generated in an image restoration process based on the first transmission by applying weighted least square (WLS) filtering based on the first transmission and morphologically-processed input image information;
   generating, by an image restoring unit, a restored image by removing a haze component in the hazy input image based on the second transmission; and
   performing, by an image processing unit, multi-scale tone manipulation image processing on the restored image,
   wherein the second transmission is calculated by an equation, $$\sum_p \left( (r_p - \tilde{r}_p)^2 + \lambda \left( w_{x,p}(h) \left( \frac{\partial r}{\partial x} \right)_p^2 + w_{y,p}(h) \left( \frac{\partial r}{\partial y} \right)_p^2 \right) \right),$$

where p denotes a position of each pixel in the hazy input image, $r_p$ denotes a refined transmission, $\tilde{r}_p$ denotes the estimated transmission value, $\lambda$ denotes a smoothing control constant, h denotes a morphologically-processed hazy image, $w_{x,p}(h)$ and $w_{y,p}(h)$ respectively denote horizontal-axis and vertical-axis smoothing weight values of the morphologically-processed hazy image, and $$\left( \frac{\partial r}{\partial x} \right)_p \text{ and } \left( \frac{\partial r}{\partial y} \right)_p$$

respectively denote horizontal-axis and vertical-axis first-order differential operators of $r_p$.

6. The device of claim 1, wherein the first transmission is calculated by an equation, $$\tilde{r}(p) = 1 - \mu \min_{q \in \Omega(p)} \left( \min_{c \in \{r,g,b\}} \frac{I^c(q)}{A^c} \right)$$

wherein p denotes a pixel position of each pixel in the hazy input image, $\tilde{r}(p)$ denotes the estimated transmission value for the pixel position p, $\mu$ denotes a constant, $\Omega(p)$ denotes a block around the pixel position p, c denotes a color channel, r denotes a red color channel, g denotes a green color channel, b denotes a blue color channel, I denotes the hazy input image, and A denotes a global atmospheric light source.

7. The device of claim 1, wherein the smoothing weight values $w_{x,p}(h)$, $w_{y,p}(h)$ of the morphologically-processed hazy image are used to preserve a region corresponding to an edge region of the morphologically-processed hazy image and smooth another region thereof in the estimated transmission, and are respectively obtained with equations, $$w_{x,p}(h) = \left( \left| \frac{\partial h}{\partial x} \right|_p^\alpha + \varepsilon \right)^{-1}, w_{y,p}(h) = \left( \left| \frac{\partial h}{\partial y} \right|_p^\alpha + \varepsilon \right)^{-1},$$

where $\alpha$ denotes an edge control constant of the morphologically-processed hazy image h that is implemented to further smooth the another region other than the region corresponding to the edge region of the morphologically-processed hazy image as $\alpha$ increases; and $\varepsilon$ denotes a constant value for preventing a denominator from being divided by 0.

8. The device of claim 1, wherein $r_p$ is further smoothed as $\lambda$ increases.

* * * * *